Patented Feb. 22, 1938

2,108,805

UNITED STATES PATENT OFFICE 2,108,805

TRANSPARENT MATERIALS AND METHOD OF PRODUCING SAME

Theron G. Finzel and Donald E. Drew, Kenmore, N. Y., assignors, by mesne assignments, to E. I. du Pont de Nemours & Company, Wilmington, Del., a corporation of Delaware No Drawing. Application June 4, 1934, Serial No. 728,857

6 Claims. (Cl. 91—68)

This invention relates to a highly transparent and moistureproof sheet material suitable for use as a wrap for printed packages, cakes, etc., whereby the package or contents may be clearly displayed and at the same time retained in its original fresh condition, and to the method of making the same. More particularly, the invention relates to a highly transparent and moistureproof paper which is substantially free from haze, that is, only a small percentage of light passing therethrough is scattered.

We have found that, if a thin sheet of paper or other material, more fully hereinafter described, is impregnated or coated with a composition consisting essentially of one or more waxes and subsequently topcoated with a lacquer or other film-forming transparent dope of the type described, there will be obtained a product which is glossy, moistureproof, highly transparent, free from spots and free from white haze or blue cast.

For the purposes of this specification and claims, we define moistureproof materials as those which, in the form of continuous, unbroken sheets or films, permit the passage of not more than 690 grams of water vapor per 100 square meters per hour, over a period of 24 hours, at approximately 39.5° C.±0.5° C., the relative humidity of the atmosphere at one side of the film being maintained at least at 98% and the relative humidity of the atmosphere at the other side being maintained at such a value as to give a humidity differential of at least 95%.

Moistureproofing coating compositions are defined as those which, when laid down in the form of a thin, continuous, unbroken film applied uniformly as a coating with a total coating thickness not exceeding 0.0005" to both sides of a sheet of regenerated cellulose of thickness approximately 0.0009", will produce a coated product which is moistureproof.

For the purposes of experimental tests, especially for those materials adaptable as coating compositions, moistureproof materials include those substances, compounds or compositions which, when laid down in the form of a continuous, unbroken film applied uniformly as a coating with a total coating thickness not exceeding 0.0005" to both sides of a sheet of regenerated cellulose of thickness approximately 0.0009", will produce a coated sheet which will permit the passage therethrough of not more than 690 grams of water vapor per 100 square meters per hour over a period of approximately 24 hours, at a temperature of 39.5° C.±0.5° C. (preferably 39.5° C. ±0.25° C.), with a water vapor pressure differential of 50–55 mm. (preferably 53.4±0.7 mm.) of mercury. For convenience, the number of grams of water vapor passed under these conditions may be referred to as "the permeability value". An uncoated sheet of regenerated cellulose having a thickness of approximately 0.0009" will show a permeability value of the order of 6900.

From the foregoing, it is apparent that under the conditions set forth, a moistureproofed regenerated cellulose sheet is capable of resisting the passage of moisture or water vapor therethrough at least ten times as effectively as the uncoated regenerated cellulose sheet.

In accordance with the principles of the invention, the selected base is impregnated or coated with wax. The product is then subsequently coated with a lacquer of the type hereinafter more fully described, whereby the haze and blue cast generally associated with waxed papers are removed, a glossy surface is imparted to the product, the typical waxy smear of waxed papers is eliminated and the product is more readily printable with the usual inks and processes. In other words, the product of the instant invention is, inter alia, flexible, readily printable, possesses a good surface slip, is moistureproof, highly transparent, free from spots and free from white haze or blue cast. If the product during its manufacture has been subjected to a drying temperature above room temperature, the coated sheet may be subjected to a humidifying treatment, whereby an amount of moisture is incorporated within the sheet equivalent to that of an air-dry condition.

In one of its phases, the instant invention relates to treating paper for the purpose of rendering it transparent and moistureproof. The paper to be treated is thin and preferably a sulphite tissue, the fibers of which are inherently transparent. Preferably, also, the tissue does not contain any opaque filling materials. The paper to be treated may or may not contain sizing materials, and it may or may not be semi-transparent, that is, the paper may be of the type which is produced from a relatively lightly beaten stock or it may be of the type produced from a highly beaten slow stock, such as is used to produce the glassine type of paper. In so far as the instant invention is concerned, the porous type of tissue is preferred, because it is cheaper than the glassine type and the porosity thereof allows better penetration of the transparentizing materials. It is, of course, understood that the more expensive types of glassine papers or papers similar to condenser papers, or even condenser papers, may be employed. Although the invention is particularly suited for paper, and preferably thin porous paper as explained, it is equally applicable to any thin, smooth, dense, non-fibrous, substantially non-porous and preferably transparent sheeting formed of a cellulosic, albuminous or other material such as, for example, rubber or rubber derivatives. As illustrative examples of cellulosic sheeting may be mentioned sheeting coagulated or precipitated from an aqueous cellulosic dispersion or solution, for example, sheeting of regenerated cellulose, glycol cellulose, cellulose glycollic acid, lowly etherified or lowly esterified cellulose, such as lowly methylated cellulose; and sheeting of cellulose derivatives, such as cellulose acetate, cellulose nitrate, ethyl cellulose, benzyl cellulose, etc. As illustrative examples of albuminous sheeting may be mentioned gelatin and casein, hardened or not, as desired.

The wax composition which impregnates or coats the selected base consists essentially of wax and is free from cellulose derivatives, resins, etc. Paraffin wax having a high melting point, such as 50° C., 55° C., 60° C., 62° C. or higher, or a mixture of paraffin wax and candelilla wax, is preferred. However, any paraffin wax or other wax or waxy substance, mixtures of waxes, mixtures of waxy substances, or mixtures of waxes and waxy substances, may be used. As several additional illustrative examples of waxes may be mentioned ceresin, palm wax and Brazil wax.

The wax may be applied from either a melt, as by spraying the molten wax on the base, followed by melting the wax on the base, or from a suitable solution, such as paraffin dissolved in an appropriate solvent, such as toluol. It may even be applied in the form of an emulsion in the paper machine. After application, the wax is caused to set. When a melt is used, this may be accomplished by permitting the wax to cool or by positively cooling the same. When a solution or dispersion containing the wax is used, the wax is fixed or set by eliminating the liquid vehicle, such as by evaporating the same.

When the base constitutes a thin porous paper, it is calendered, preferably super-calendered, prior to the impregnation with wax. To produce a product of maximum flexibility and suppleness, it is desirable also to soften the paper before the wax treatment with a suitable cellulose softener, such as glycerin, diethylene glycol or other suitable softening agents. Such a softener may be applied in the paper machine, by passing the paper through an aqueous solution of the softener followed by drying to a suitable moisture content for calendering, or by moistening the paper with an aqueous solution of the softener prior to calendering or super-calendering. When a small quantity of wax is applied to the paper, the paper is calendered again after the application of the wax. The second calendering should be carried out hot to insure maximum impregnation and uniformity. The double calendering aids in producing a uniform sheet having a surface suitable for lacquering.

If the waxed paper is to be calendered, the amount of wax may be any amount up to 10 pounds of wax per 100 pounds of paper. If it is desired not to calender the waxed paper, more wax may be applied. In such a case, the amount of wax may be as much as 75 or even 90 pounds per 100 pounds of paper.

The topcoat may be applied to the waxed base in any convenient manner, such as by passing the waxed base through the selected lacquer bath, the excess lacquer being removed by suitable means, as doctor knives or rolls. If desired, the topcoat lacquer may be sprayed on the base or may be brushed on or otherwise delivered in a uniform quantity to each surface of the film as from two hoppers, one on each side of the film.

The topcoat may be air-dried at room temperature or preferably be force-dried at an elevated temperature up to 110° C. When the topcoat lacquer is applied to a waxed paper containing a small amount of wax, and which may or may not have been hot-calendered after waxing, drying at an elevated temperature, and even at a temperature at least equal to the melting point of the wax, is not objectionable. However, if the waxed paper contains a large proportion of impregnated and/or adhering wax, it is desirable to dry the topcoat at a temperature below the melting point of the wax. It is to be noted that by "drying temperature" of the lacquer-coated sheet we mean the actual temperature of the sheet and not the temperature of the air in the drying compartment in which the sheet has been placed. These two temperatures may widely differ, the actual temperature difference depending on the volatility and latent heat of the solvents in the lacquer, the velocity of the air in the drier and the degree to which the air in the drier has been saturated with solvent vapor. As an illustration of such a temperature difference, we have found that a lacquer containing ethyl acetate and alcohol as solvents was dry to the touch when the temperature of the film reached 45° C., even though the air temperature in the drier was held at 90° C. The temperature of the coat of lacquer solids gradually approached 90° C., during which time the remaining traces of solvents evaporated. It is important to note that after the lacquer coat is "set", that is, dry to the touch, it shows very little tendency, if any, to intermingle or amalgamate with the wax in the base. The critical temperature of drying then is the temperature of "setting", that is, the temperature at which the lacquer coat has become dry to the touch.

The type of lacquer suitable as a topcoat for the wax-treated base depends upon the flexibility, toughness, etc. desired of the topcoat and more especially upon the proportions of the wax in the base.

If the base is paper and contains a relatively small proportion of wax, 2 to 10 pounds of wax per 100 pounds of paper, a lacquer will produce satisfactory results if its solvents will dissolve the wax from the base and if its solids are compatible with the wax dissolved. In such a case, a remarkable effect is produced in that the wax-treated paper appears decidedly less hazy than when the untreated paper is coated or impregnated with a wax-containing lacquer other than that set forth in copending application Serial No. 717,938, filed March 29, 1934. In the instant process the wax aids the penetration of the lacquer into the fine spaces between and in the fibers of the sheet. The action of the wax is similar to the action of a soap as described in copending application Serial No. 732,440, filed June 26, 1934. If desired, the paper may be pretreated with a soap as set forth in the previously mentioned application to improve the thoroughness and speed of the wax penetration.

As previously explained, when the paper contains a low wax content, it is preferable to calender or indeed super-calender the paper before and after the wax impregnation. After the second calendering or super-calendering, the topcoat lacquer is applied, the temperature of the lacquer being relatively high (approximately 50° C. to 75° C.), and the lacquered sheet is dried in a chamber heated to a temperature above the melting point of the wax to insure intermingling of the wax and lacquer solids and a product free from wax blush.

When the paper contains a large proportion of wax (10 to 90 pounds of wax per 100 pounds of paper), it is essential to choose a lacquer, the solvents of which show little or no solvent action toward the wax at the drying temperature. In this modification a layer of lacquer solids will be superposed upon the wax-treated base.

The superposed layer of lacquer solids is as thin as possible. Preferably, the topcoat should be of such thickneess as is sufficient to remove the greasiness and the microscopic roughness of the wax undercoat and present a glossy appearance. It is truly remarkable that these thin topcoats completely remove the blue cast generally associated with waxed paper. In this modification it is immaterial whether the topcoat solids are compatible with the wax in the paper base, since there is substantially no intermingling between the wax and topcoat. Precautions, therefore, must be taken in setting up the coating conditions so that little or no intermingling between the wax and topcoat takes place.

The lacquer temperature during application to the base containing a large proportion of wax should be between approximately 20° C. and 30° C., or lower. The lacquered material should not be subjected to a temperature above the melting point of the wax until the topcoat has set. It is best to keep the temperature of the drying chamber 10° C. or 15° C. below the melting point of the wax. In some cases satisfactory results have been secured by drying the topcoat lacquer at room temperature.

The finished product may contain as high as 2 parts of wax to 1 part of topcoat lacquer solids or even 5 parts of wax to 1 part of lacquer solids. Even in the extreme ratio, the product is transparent, clear and free from wax blush.

If the base is other than paper, the same general conditions of compatibility of wax and topcoat will apply. If a non-porous base, such as a thin sheeting formed of cellulosic or albuminous material, and of the type previously mentioned, is to be treated according to this process, considerably less wax will be necessary to produce an effect similar to that produced on porous paper. This is evident because the wax exists as a coating on the surface of the film, there being no penetration into the film as in the case of the porous base.

Apart from the wax compatibility with the topcoat just discussed, any type of topcoat lacquer may be used as long as it improves the gloss of the wax base, removes the greasiness, is non-brittle and non-tacky. The following types of lacquers have been used:

1. Cellulose derivatives-plasticizers-solvents.
2. Cellulose derivatives-solvents.
3. Cellulose derivatives-resins - plasticizers-solvents.
4. Cellulose derivatives-resins-solvents.
5. Resins-plasticizers-solvents.
6. Resins-solvents.

If desired, a moistureproofing wax or waxy substance of the type previously described may be incorporated in the lacquer.

The resin or gum may be either natural or synthetic. As illustrative examples of resins used in the preparation of satisfactory lacquers may be mentioned rosin, hydrogenated rosin and its derivatives, including glycerol, glycol or diethylene glycol esters of hydrogenated rosin; rosin esters of glycerol, glycol or diethylene glycol; gum dammar; the glyptals, either modified or unmodified; vinyl resins of the polymerized vinyl acetate, polymerized chlorvinyl acetate, and polymerized vinyl acetal resin types; or metastyrene resin. We may, however, use any resin or gum which will give a suitable topcoat and possess the qualities of non-brittleness and toughness which are desired.

When the lacquer contains a cellulose derivative, we have found that ethyl cellulose or cellulose nitrate are very satisfactory. We prefer to use a cellulose derivative possessing a viscosity equal to or less than that of 60 second nitrocotton. Othere cellulose ethers and also cellulose esters, such as cellulose acetate, cellulose propionate, or cellulose aceto-nitrate or aceto-propionate, may be used.

When the lacquer contains a plasticizer, we prefer to use one or more of the compounds which have a softening action on cellulose derivatives, on the gum or resin, or on both the cellulose derivative and gum or resin when the lacquer contains them. We prefer to use a plasticizer which is practically odorless. We have obtained excellent results with the use of ethyl-metatoluenesulfonamide, tricresyl phosphate, triphenyl phosphate, or dibutyl phthalate. We are, however, not limited to these and may use any plasticizer generally used in the manufacture of cellulose derivative lacquers. In many cases, it is not necessary to use a plasticizer at all. In such a case a soft gum or resin may be chosen which functions both as a gum or resin and a plasticizer. An example of such a soft gum or resin is the rosin ester of diethylene glycol or a soft glyptal.

As previously mentioned, the type of lacquer solvent used is exceedingly important. If the solvents attack the wax on the base, a blush may result unless the lacquer solids are very compatible with the wax in question, as for instance a lacquer containing a high proportion of resin. When the wax used for the undercoat consists of either paraffin wax or a mixture of three parts by weight of paraffin and one part by weight of candelilla wax, any solvent mixture containing a relatively large proportion of toluol or naphtha, or any other type of hydrocarbon solvent which will show solvent action on the wax undercoat, may be used. However, esters or alcohols, especially the lower esters or alcohols, such as ethyl acetate, or ethyl alcohol, have substantially no solvent action on these waxes unless the temperature of the lacquer bath is raised considerably above room temperature to a point approaching the melting point of the wax. It is evident that the lacquer solvent mixture must perform two functions, namely, it must act as a suitable solvent for the lacquer solids and it must also act toward the wax undercoat in keeping with the wax compatibility of the lacquer solids. The following examples are given to illustrate the principles discussed above. All of the examples are expressed in percent by weight.

EXAMPLE I (A) A thin, porous sulphite tissue 0.0005" to 0.001" in thickness is moistened with water or steam or with a 10%–20% aqueous glycerin solution until it feels distinctly damp. The damp paper is passed through a super-calender stack, the rolls of which are cooled. This is followed by another super-calendering operation in which hot rolls are used. If desired, these two calendering operations may be combined into one operation in which half the rolls are cold and half heated. The paper, as it emerges from the hot calender rolls, is dry and has a fine polish. The calendered tissue is passed through an 8% to 12% solution of paraffin wax (melting point 60° C. to 62° C.) in toluene maintained at approximately between 35° C. and 50° C. and the excess solution is removed by doctor knives or glass rods. The treated paper base is subjected to an elevated temperature (85° C. to 95° C.) to evaporate the toluene completely and to melt the wax adhering to the paper sheet. The wax-treated paper at this point contains between 8 lbs. and 12 lbs. of wax per 100 lbs. of raw paper and is smeary and quite hazy in appearance.

The wax-treated sheet is passed through a lacquer bath, the temperature of which is held at 20° C.–30° C. and the composition of which is as follows:

Solids

| | Per cent |
|---|---|
| ½ second nitrocotton | 62.5 |
| Tricresyl phosphate | 37.5 |
| Total | 100.0 |

Solvents

| | Per cent |
|---|---|
| Ethyl acetate | 98.2 |
| Ethyl alcohol | 1.8 |
| Total | 100.0 |

Solids content—8%–15%.

The excess lacquer is allowed to drain from the sheet or is scraped off gently by means of doctor knives or glass rods. The lacquer-coated sheet is dried by passing it through a heated chamber, or other suitable drier, held at 70° C.–90° C. to remove all of the lacquer solvent. Even though the drier is held at this high temperature, it is important to note that the temperature of the lacquered sheet does not rise above 50° C. until the lacquer is dry to the touch. After most of the lacquer solvents have been evaporated at this low temperature and the lacquer coat has set, it is not harmful to allow the temperature of the lacquered sheet to rise to that of the drier. To replace the normal amount of moisture which was removed from the sheet during the drying of the lacquer, the coated sheet is passed through a humidity chamber in which the temperature is held between 40° C. and 60° C. and the relative humidity is controlled between 60% and 85%, in which operation moisture equivalent to an air-dry condition of the product is picked up. The film is finally wound up on a suitable core.

The amount of lacquer applied to the wax-treated paper may vary between 5–20 lbs. of lacquer solids to 100 lbs. of wax-treated paper. The thickness of the final sheet is between 0.0008″ and 0.0018″.

The product is moistureproof, flexible, free from white haze, free from characteristic blue wax blush, and will show a good light transmission. None of the characteristic wax smear, typical of wax paper, is present in the product. The product is remarkably clear and free from haze or blush, considering the amount of wax actually present in the product. If the same original paper had been impregnated with a single lacquer containing the same proportion of lacquer solids and wax as is present in the instant finished product and dried in the above-described manner, the final product would be hopelessly blushed so that it would render it absolutely useless as a transparent wrap. Thus, it is evident what remarkably different results can be obtained through the use of this two-step process, rather than attempting to incorporate the wax in a single lacquer. The solvents in this example are designed so that they will not attack the wax-treated sheet and the drying is carried out under such conditions that the lacquer solids will not intermingle, at least not to any great extent, with the wax in the paper base.

(B) This is similar in every respect to (A) with the exception that the lacquer topcoat is dried at room temperature and the humidification step is omitted. In this procedure it is not necessary to humidify the product, since no moisture was lost from the paper during the evaporation of the lacquer solvents. It is obvious that the drying operation at room temperature will consume much more time than when carried out at the elevated temperature used in (A). The characteristics of the product will be the same as those indicated in (A). If only a small proportion of the wax actually present in the wax-treated base were incorporated in a single lacquer with the topcoat solids used and that lacquer used to treat a paper base free from wax, such a treated product, when dried at room temperature, would be blushed to such an extent as to make it absolutely worthless as a transparent wrap. Its moistureproofness also would be decidedly decreased.

(C) The wax-treated paper described in (A) is coated with the following topcoat lacquer which is held at 20° C.–30° C., during the coating operation, which coating operation is carried out in the same manner as in (A):

Solids

| | Per cent |
|---|---|
| ½ second nitrocotton | 62.5 |
| Rosin ester of diethylene glycol | 37.5 |
| Total | 100.0 |

Solvents

| | Per cent |
|---|---|
| Ethyl alcohol | 2.4 |
| Mono-butyl ether of ethylene glycol | 3.8 |
| Ethyl acetate | 93.8 |
| Total | 100.0 |

Solids content—13%

The excess lacquer is removed by scraper rods or with doctor knives and the lacquer-coated sheet is dried at room temperature (20° C.–35° C.). These lacquer solids, containing a high proportion of cellulose derivative, are quite incompatible with wax, yet, if applied in the manner described, will produce a clear sheet with no blue wax cast or milky haze. In addition, a highly moistureproof product results.

(D) The wax-treated paper described in (A) is passed through a bath of the following lacquer composition held at 20° C.–30° C.:

Solids

| | Per cent |
|---|---|
| 60 second nitrocotton | 38.4 |
| Polymerized vinyl acetate | 38.4 |
| Tricresyl phosphate | 23.2 |
| Total | 100.0 |

Solvents

| | Per cent |
|---|---|
| Ethyl acetate | 98.1 |
| Ethyl alcohol | 1.9 |
| Total | 100.0 |

Solids content—8% to 13%

The excess lacquer is removed by means of scraper rods or doctor knives and the coated sheet is dried as under (A), i. e., it is passed through a dryer held between 70° C. and 90° C. Here again, it is essential that the wax in the paper and the topcoat are not allowed to intermingle, at least not to any extent, since the lacquer solids are quite incompatible with the wax. The product takes on the characteristics of the topcoat in that it is flexible, non-smeary, free from the characteristic wax haze, shows a high light transmission, and is moistureproof.

(E) The same wax-treated paper, the same lacquer, and the same treating procedure described in (D) are used, with the exception that the lacquered paper is dried at room temperature or thereabouts. The time for drying is necessarily longer than in (D), due to the lower rate of evaporation. It is obvious that the wax-treated sheet need not be dipped into and passed through a lacquer bath, but that the topcoat lacquer may be applied by brushing, spraying, or any other similar manner. By drying at room temperature, it is not necessary to have any elaborate drying equipment to produce a highly moistureproof, non-smeary, and non-hazy product.

(F) The wax-treated paper described in (A) is coated with a solution of 60 second nitrocotton dissolved in a mixture of 97.5% ethyl acetate and 2.5% ethyl alcohol. The solids content may vary between 5% and 10%. The lacquer is allowed to dry at room temperature. A remarkable result is obtained in that a thin film of such a highly incompatible material as nitrocotton changes the appearance and properties of the wax-treated sheet. The cloudy, milky, smeary waxed paper is converted by such a simple process into a non-cloudy, non-hazy and non-smeary product which shows good light transmission and which is highly moistureproof.

(G) Instead of a cellulose derivative or a cellulose derivative composition topcoat lacquer, a topcoat lacquer consisting of the following may be used:

Solids

| | Per cent |
|---|---|
| Styrene resin | 85.1 |
| Dibutyl phthalate | 14.9 |
| Total | 100.0 |

Solvents

| | Per cent |
|---|---|
| Ethyl acetate | 100.0 |

Solids content—11.5%.

The lacquer is applied at room temperature to the wax-treated paper described in (A) by dipping, spraying or brushing, and it is dried at approximately room temperature. The resin-plasticizer mixture is quite incompatible with the wax, yet it causes the cloudy, wax paper to become remarkably clear and free from haze and wax smear. The product is flexible, moistureproof, and shows a good light transmission.

EXAMPLE II (A) A thin paper, 0.0005" to 0.001" in thickness, is moistened with water or steam or other suitable means until it feels distinctly damp. The dampened paper is passed through a super-calender stack, the rolls of which are heated. The dried, calendered paper is treated with a 3–5% solution of paraffin and candelilla wax in toluol. The ratio of the paraffin to the candelilla wax is 3:1 and the temperature of the wax solution is held between 45° C. and 85° C. A high melting paraffin is used (60° C.–62° C.). After the excess wax solution is removed by means of doctor knives or scraping rods, the toluene solvent is removed by passing the paper through a drying chamber held at 70° C.–90° C. The wax-treated paper is then passed through a super-calender, the rolls of which are heated. In this operation the wax is melted locally and forced between the fibers. The wax-treated, calendered paper will contain between 3 lbs. and 8 lbs. of wax per 100 lbs. of paper. The wax-treated paper at this point appears very hazy and presents a waxy feel when rubbed between the fingers.

The wax-treated paper is passed through a lacquer bath held at 60° C.–75° C. and having the following composition:

Solids

| | Per cent |
|---|---|
| Rosin | 58.8 |
| Ethyl cellulose (low viscosity) | 29.4 |
| Ethyl metatoluene sulfonamide | 11.8 |
| Total | 100.0 |

Solvents

| | Per cent |
|---|---|
| Low flash naphtha | 90.0 |
| Ethyl alcohol | 10.0 |
| Total | 100.0 |

Solids content—15.0%.

The wax-treated sheet is allowed to remain in the lacquer bath for 10 seconds or longer. The excess lacquer is scraped from the sheet by means of rods or doctor knives and the lacquer-treated sheet is dried in a drying chamber held at 65° C.–110° C. In addition to removing the solvent, it is intended in this drying operation to raise the temperature of the sheet to such a point at which the wax in the sheet and the lacquer solids will freely intermingle, since the lacquer solids are compatible to a degree with the wax. In fact, the wax in the paper acts as a penetrating agent for the lacquer which is held at or above the melting point of the wax during impregnation. Some of the wax is no doubt dissolved from the paper. The paper, however, retains sufficient wax to produce a highly moistureproof product. In addition to being moistureproof, the product is flexible, shows excellent light transmission, is free from spots or milky haze, and is free from blue wax blush. After the sheet has been coated and dried, it is subjected to a humidifying treatment at 60% to 85% relative humidity and at least 40° C.

(B) Using the same wax-treated paper and the same method of lacquer treatment and the same conditions throughout as in Example II—A, however, substituting the following lacquer, results similar to those in Example II—A will be obtained:

| Solids | Per cent |
|---|---|
| ½ second nitrocotton | 33.8 |
| Alkyd resin | 31.2 |
| Rosin | 25.0 |
| Triphenyl phosphate | 10.0 |
| Total | 100.0 |

| Solvents | Per cent |
|---|---|
| Ethyl acetate | 83.0 |
| Toluene | 4.9 |
| Mono-butyl ether of ethylene glycol | 10.5 |
| Ethyl alcohol | 1.6 |
| Total | 100.0 |

Solids content—13.5%.

Note.—The alkyd resin in the above composition consist of 55% glyceryl phthalate; stearin 20%; castor oil 25%.

(C) The wax-treated paper is prepared in the same manner as described in Example II—A, using, however, a 3%–5% solution of paraffin wax rather than a mixture of paraffin and candelilla wax. The paraffin wax has a melting point of 60° C.–62° C. The paraffined paper is coated with the same lacquer described in Example II—A. The methods of coating, drying and humidifying the product are the same as described in Example II—A. A product with properties similar to those described in Example II—A will be obtained.

(D) A wax-treated paper is prepared in the same manner as described in Example II—A, using, however, a 3%–5% solution of paraffin wax rather than a mixture of paraffin and candelilla wax. The paraffin wax has a melting point of 60° C.–62° C. The paraffined paper is coated with the same lacquer described in Example II—B. The methods of coating, drying and humidifying the product are the same as described in Example II—A. A product with properties similar to those described in Example II—B will be obtained.

EXAMPLE III (A) A thin, moist paper, 0.0005″ to 0.001″ in thickness, is passed through a super-calender, the rolls of which are heated. The dried, calendered paper is passed through a bath of molten paraffin wax, the melting point of which paraffin is 60° C.–62° C. The temperature of the melt is not allowed to rise above 110° C. The sheet is scraped well or passed through squeeze rolls to remove the excess paraffin and is allowed to cool. The waxed paper is hazy in appearance and possesses a smeary surface similar to ordinary waxed papers and contains between 15 pounds and 90 pounds of wax per 100 pounds of raw paper.

The waxed paper is coated with the lacquer described in Example I—A, which lacquer is held between 20° C. and 30° C.

The lacquer is applied to the waxed sheet by spraying, brushing, by passing the waxed sheet through a bath of the lacquer, or by delivering a uniform quantity of lacquer to each surface of the film from two hoppers, one on each side of the film. In this latter case, the lacquer issues from suitably designed hopper lips, one of which is in contact with each surface of the paraffin-treated paper.

The coated sheet is dried as described under Example I—A, that is, passing the coated sheet through a dryer held between 75° C. and 90° C. Humidification is carried out as described under Example I—A.

Even though the paper contains a large amount of wax, coating it with the above-described lacquer topcoat, which is quite incompatible with the wax, produces a product which is remarkably free from the waxy appearance and does not possess the smeary surface originally present in the waxed paper before coating. In addition, the product is highly moistureproof.

(B) The process is carried out exactly in all details as described in Example III—A, using, however, the following topcoat lacquer:

| Solids | Per cent |
|---|---|
| 60 second nitrocotton | 38.4 |
| Polymerized vinyl acetate | 38.4 |
| Tricresyl phosphate | 23.2 |
| Total | 100.0 |

| Solvents | Per cent |
|---|---|
| Ethyl acetate | 98.1 |
| Ethyl alcohol | 1.9 |
| Total | 100.0 |

Solids content—8% to 13%

(C) The wax paper described in Example III—A is coated with the lacquer described in Example III—B. The method of coating is the same as that described in Example III—A. The drying of this lacquer is, however, carried out at room temperature (20° C.–35° C.). No humidification is necessary after the solvents have evaporated from the lacquer topcoat. The product has an appearance similar to that described in Example III—B, but the gloss is improved. Other properties are similar.

(D) The waxed paper described in Example III—A containing preferably about 20 lbs. of paraffin wax to 100 lbs. of paper is coated with the following composition:

| | Per cent |
|---|---|
| Dewaxed shellac | 44 |
| Denatured alcohol | 56 |
| Total | 100 |

The waxed paper is dipped into the coating solution held at about 25° C. to 35° C. and the excess solution is scraped off, as with doctor knives or glass rods. The supercoated film is dried at about room temperature. The resulting product contains 5 to 10 lbs. of shellac to 100 lbs. of the waxed paper. The product is free from wax haze and smear, is glossy, shows a high light transmission and is moistureproof.

EXAMPLE IV (A) The same dampened and calendered paper as in Example I—A is passed through a bath of molten petrolatum (a high melting petrolatum, Wax #906, manufactured by the Cochrane Chemical Co. of Jersey City, New Jersey), and the excess wax is removed by suitable scraper rods or squeeze rolls so that the waxed paper contains 15 lbs. to 30 lbs. of wax per 100 lbs. of paper. The waxed product will be very hazy and quite tacky. The waxed product is then coated with the same lacquer and under the same conditions as in Example I—A. The product will be remarkably clear and free from wax cast and tackiness, will be very flexible, glossy and much improved in moistureproofness. The unwaxed tissue has a permeability value approximately that of regenerated cellulose and is of the order of 6900. The waxed intermediate product shows a permeability value of the order of 230 to 345 while the final super-coated product shows permeability values ranging from 45 to 70.

EXAMPLE V (A) A film of transparent, regenerated cellulose, about 0.001" in thickness, is passed through a bath of molten wax (Orange Syncera, melting point 145° to 148° F., manufactured by the Standard Oil Co. of Indiana), and the excess is scraped off by means of doctor knives, or other suitable means. The waxed film is cloudy, has a wax cast and is very smeary. The waxed film is then coated with the same lacquer applied to the waxed paper in Example I—A. The lacquer film is dried at 50° C. to 75° C., preferably for only such a time that the lacquer is dry and the wax is not melted for any appreciable time. The dried product is then humidified at 60% to 85% relative humidity and 40° to 60° C. The finished product will be clear and glossy, moistureproof and will have no trace of a wax smear. The finished film will be composed of 5 lbs. to 10 lbs. of wax and about 10 lbs. of lacquer solids per 100 lbs. of regenerated cellulose film.

(B) The same transparent, regenerated cellulose film as in Example A is given the same wax treatment and coated with the same lacquer. However, instead of drying at an elevated temperature, the lacquer, after scraping off the excess, is dried at about room temperature (20° C. to 35° C.). At this drying temperature, no precautions are necessary to prevent the melting of the undercoat of wax, nor is it necessary to humidify. While the drying time will be longer, since a lower drying temperature is used, the final product will be in every respect equal to that produced in Example A.

A dyed or colored product may be produced by either dyeing or coloring the base before it is waxed, or by applying a colored wax or a colored topcoat to the base. The product may be tinted to neutralize certain objectionable colors of the resins used in the lacquer. Such tinting may be carried out by applying a small amount of dye or finely divided colored colloidal material directly to the base in a separate operation, or during the manufacture of the base, or such tinting material may be added to the wax or to the topcoat lacquer.

Since it is obvious that various changes and modifications may be made in the above description without departing from the nature or spirit thereof, this invention is not restricted thereto except as set forth in the appended claims.

We claim:

1. A method of making paper suitable for use as a transparent wrapping tissue which comprises calendering a thin porous sulphite tissue, passing said calendered paper through an 8% to 12% solution of paraffin wax in toluene maintained at a temperature of between approximately 35° C. and 50° C., removing the excess solution, subjecting the treated paper base to a temperature sufficient to evaporate the toluene and to melt the wax adhering to the paper, passing the wax-treated sheet through a lacquer the solids of which consist of 62.5% of half-second nitrocellulose and 37.5% of tricresyl phosphate, and subjecting the lacquer-treated sheet to an elevated temperature to remove the lacquer solvent.

2. A method of making paper suitable for use as a wrapping tissue which comprises calendering a thin moistened paper, treating said calendered paper with a 3% to 5% solution of paraffin and candelilla wax in toluene, the ratio of the paraffin to the candelilla wax being 3:1, removing the excess solution, subjecting the treated paper to a temperature sufficient to evaporate the toluene, calendering the wax-treated paper, passing the wax-treated paper through a lacquer the solids of which consist of 58.8% rosin, 29.4% ethyl cellulose (low viscosity), 11.8% ethyl metatoluene sulfonamide, removing the excess lacquer, and drying the lacquer-treated sheet.

3. A method of making a transparent material suitable for use as a wrapping tissue comprising passing a film of transparent regenerated cellulose through a bath of molten wax, removing the excess wax, coating the waxed material with a lacquer the solids of which consist of 62.5% of half-second nitrocellulose and 37.5% of tricresyl phosphate, and subjecting the lacquered material to a temperature for a time sufficient to dry the lacquer and not melt the wax for any appreciable time.

4. A method of transparentizing which comprises applying a lacquer to a hazy waxed material in which the base thereof is of the class which consists of paper free of opaque fillers and thin, smooth, dense, non-fibrous transparent sheeting, and drying the lacquered material.

5. A method of transparentizing which comprises applying a lacquer to a hazy waxed material in which the base thereof is of the class which consists of paper free of opaque fillers and thin, smooth, dense, non-fibrous transparent sheeting, said lacquer containing a solvent in which the wax is insoluble even at the temperature at which the lacquer is dried, and drying the lacquered material, until at least the lacquer has set, at a temperature below the melting point of the wax.

6. A method of transparentizing which comprises applying a lacquer to a hazy waxed material in which the base thereof is of the class which consists of paper free of opaque fillers and thin, smooth, dense, non-fibrous transparent sheeting, said lacquer containing solids which are compatible with the wax and a solvent in which the wax is soluble, and drying the lacquered material.

THERON G. FINZEL.
DONALD E. DREW.